United States Patent

[11] 3,633,045

[72] Inventor Frederik Nordling
Sausalito, Calif.

[21] Appl. No. 4,636
[22] Filed Jan. 21, 1970
[45] Patented Jan. 4, 1972
[73] Assignee Lynch Communication Systems, Inc.
San Francisco, Calif.

[54] MULTIPLE LEVEL DETECTOR
4 Claims, 7 Drawing Figs.

[52] U.S. Cl. .......... 307/235, 307/242, 328/103, 328/116, 328/150, 328/164
[51] Int. Cl. .......... H03k 5/20
[50] Field of Search .......... 307/235, 235 A, 241, 242, 243; 328/71, 103, 105, 116, 117, 147, 150, 152, 153, 164, 168

[56] References Cited

UNITED STATES PATENTS

| | | | |
|---|---|---|---|
| 3,123,721 | 3/1964 | Kaufman | 307/235 X |
| 3,092,732 | 6/1963 | Milford | 307/235 |
| 3,187,199 | 6/1965 | Chur | 307/235 |
| 3,428,826 | 2/1969 | Berry | 307/235 |
| 3,428,827 | 2/1969 | Berry | 307/235 |
| 3,335,292 | 8/1967 | Alburger | 328/147 X |
| 3,343,152 | 9/1967 | Hart | 307/243 X |
| 3,493,782 | 2/1970 | Georgi | 328/150 X |

*Primary Examiner*—Stanley T. Krawczewicz
*Attorney*—Mellin, Morre & Weissenberger

ABSTRACT: A solid-state dual limit detector circuit provides three outputs depending on whether an input signal is more positive than a positive limit, more negative than a negative limit, or between the two limits. The sampling, decision making, storage, and timing functions of the signal pulse reconstituting circuits of a PCM telephone repeater are combined in a single circuit by providing such a dual limit detector with momentary sampling capability and a lock-in feature to hold the detected indication for half a clock cycle. The two extreme outputs of the dual limit detector control a pair of saturated amplifiers whose outputs are coupled in opposite directions to an output transformer to produce the reconstituted PCM signal.

INVENTOR
FREDERIK NORDLING
BY
Mellin, Moore + Weissenberger
ATTORNEYS

INVENTOR
FREDERIK NORDLING
BY
Mellin, Moore + Weissenberger
ATTORNEYS

INVENTOR.
FREDERIK NORDLING
BY
Mellin, Moore & Weissenberger
ATTORNEYS

MULTIPLE LEVEL DETECTOR

BACKGROUND OF THE INVENTION

In the pulse code modulation (PCM) type of telephone transmission, the function of the repeater is to reconstitute and transmit a fresh signal pulse train in synchronism with the degraded signal pulses coming in from the previous section of line. This function is accomplished by sampling the equalized incoming signal pulse train at its most representative moments, algebraically sensing the presence of a signal pulse, and storing the sensed information for a sufficient length of time to enable the circuit to produce a reconstituted square wave output in synchronism with the incoming signal.

In the prior art, these functions have been accomplished either by separate circuits, or by a blocking oscillator arrangement. The latter arrangement, though simpler, is susceptible to reflections from the output and has a tendency to free-run at 10 kilocycles or 1.544 megacycles when no signal is present. Also, the conventional blocking oscillator arrangement requires two adjustments at the factory. By contrast, the circuit of the present invention requires no adjustment, does not free-run at any frequency, and is totally insensitive to reflections from the output.

As to the dual limit detector, which itself is an inventive component of the sampling circuit of this invention, its functions, where needed in prior art electronic circuitry, were carried out in the past by at least two separate logic circuits each responsive to a single limit. The outputs of these logic circuits then had to be combined in a third logic circuit to provide a between-limits output. The resulting circuit assembly was quite complex compared to the inventive dual limit detector described herein.

SUMMARY OF THE INVENTION

The circuit of this invention achieves the aforementioned results by providing a novel solid state dual limit detector in which current flows in one of three branches depending upon whether the signal input to the detector is more positive than a positive limit, more negative than a negative limit, or between the two limits.

For sampling purposes, the dual limit detector is momentarily actuated at the optimum sampling instant by a clock spike, and the condition sensed at that moment is then locked in until released by a subsequent clock spike of the opposite polarity. The output of the branch of the dual limit detector which is responsive to the presence of a positive signal pulse is used to drive an output transformer in one direction, and the output of the branch responsive to the presence of a negative signal pulse is used to drive the output transformer in the opposite direction.

The result of the arrangement is that the presence of a positive signal pulse at the moment of sampling triggers the production of a positive square-wave output pulse whose duration is determined solely by the interval between the negative and positive clock spikes, and whose amplitude is dependent upon only the design parameters of the circuit itself. In like manner, the presence of a negative signal pulse at the moment of sampling triggers a negative square-wave output pulse whose duration and amplitude are independent of the incoming equalized signal.

Inasmuch as the circuit of this invention contains no resonant circuits, it cannot free run; and inasmuch as the outputs of the dual limit detector are isolated from the line by saturated amplifier stages, the circuit cannot be affected in any way by reflections from the line. Furthermore, inasmuch as no component of the circuit is particularly critical, no adjustments of the circuit are necessary before putting it into service.

One object of the invention is to provide, broadly, a multiple limit detector circuit of simple construction.

Another object of the invention is to provide a multiple limit detector circuit by connecting a plurality of transistors in a common-emitter configuration to a constant emitter current source, and connecting the bases of the transistors so that a different base will be the most positive base for each separate signal level to be detected, so that a different transistor will conduct at each signal level.

A further object of the invention is the utilization of a dual limit detector according to this invention to combine the sampling, decision making, storage, and timing functions of the signal pulse reconstituting circuits of a PCM repeater into a simple, stable circuit substantially impervious to external influences, including supply voltage variations.

DESCRIPTION OF THE PREFERRED EMBODIMENT

Figures 4, 5, 7:
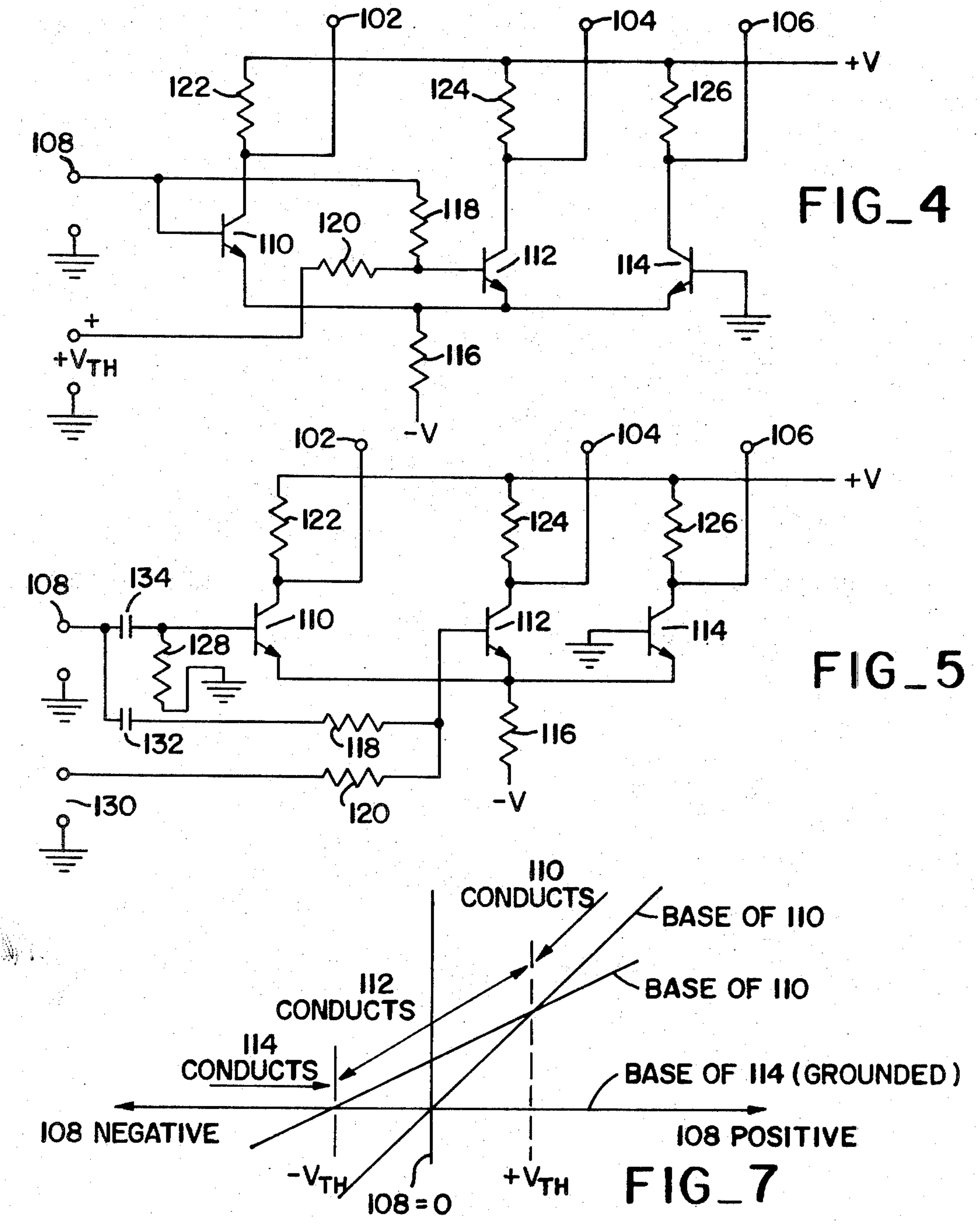
FIG. 4 is a diagram of the multiple limit detector of this invention.
FIG. 5 is a diagram of an AC-coupled modification of the circuit of FIG. 4.
FIG. 7 is a graph of the base potentials of the transistors of the circuit of FIG. 4 as a function of the input potential.

The heart of this invention is a solid state multiple limit detector, whose nature and functioning is illustrated in detail with respect to a dual limit detector in FIGS. 4–7. Referring to FIG. 4, the nature of the circuit is such that at all times, one of the three outputs 102, 104, 106 is negative with respect to the +V supply, while the other two outputs are at the potential of +V which of the outputs 102, 104, 106 is thus active depends on the algebraic value of the potential at the input 108.

The circuit of FIG. 4 functions as follows: Transistors 110, 112, 114 and resistor 116 form a current switch. This is so because when the negative supply voltage −V is large enough to cause an approximately constant current to flow through resistor 116, that current will flow, at any given time, only through the transistor whose base is the most positive at that time, the other two transistors being thereby back-biased to cutoff.

The base of transistor 110 is connected directly to the input 108, hence its potential is equal to the input potential. The base of transistor 112 is connected to the center tap of a voltage divider 118, 120 which produces, at the base of transistor 112, a voltage equal to the constant threshold voltage $V_{TH}$ plus a proportion, determined by the ration of resistors 118, 120, of the algebraic difference between $V_{TH}$ and the input voltage 108. The base of transistor 114 is grounded. The variation of the three transistor base potentials with variation in the input voltage is graphically illustrated in FIG. 7 for the condition where resistors 118, 120 are equal.

Figure 6:
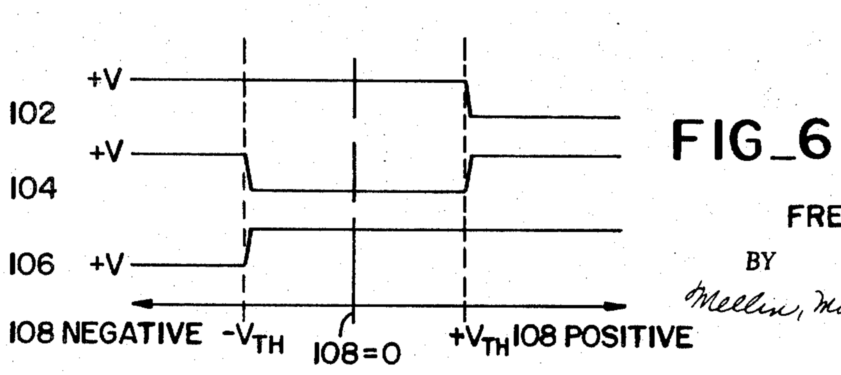
FIG. 6 is a graph of the output potentials of the circuit of FIG. 4 as a function of the input potential.

The threshold voltage $V_{TH}$, which may be supplied by an suitable constant voltage source, determines, when resistors 118, 120 are equal, the absolute value of the input signal at which the switchover from one transistor to the other occurs, as illustrated in FIG. 6. It will be noted that in the circuit shown, the positive switchover potential is fixed at $+V_{TH}$, but that the negative switchover potential can be varied over a wide range by varying the relative proportions of voltage divider resistors 118, 120.

Likewise, the ranges or levels detected by the circuit can be changed by connecting the base of transistor 114 to a potential other than ground, and more than three ranges or levels can be detected by providing additional transistor branches and energizing their bases with different values of constant potentials and/or different proportions of the signal potential.

The active (i.e. negative with respect to =V) condition of the outputs 102, 104, 106 shown in FIG. 6 is provided by the load resistors 122, 124, 126, which produce a constant voltage drop (due to the constant current through resistor 116) whenever the transistor associated therewith conducts. If less than all possible levels are to be detected, any load resistor associated with a brand for which no output is needed may, of course, be omitted.

An AC-coupled variant of the circuit of FIG. 4 is shown in FIG. 5. In that figure, the base of transistor 110 is DC grounded through resistor 128, while the base of transistor 112 is maintained at a constant DC potential of $\frac{1}{2}V_{TH}$ by the constant potential source 130, due to the presence of the DC-blocking coupling capacitors 132, 134. The potential source is so arranged (e.g. by a capacitive bypass, not shown) that its AC impedance is negligible.

When an AC signal of a frequency at which the impedance of coupling capacitors 132, 134 is negligible is applied to input 108, the resistors 118, 120 function as an AC (but not DC) voltage divider, and the instantaneous AC potential at their junction is added to the steady state DC potential of $\frac{1}{2}V_{TH}$ normally impressed on the base of transistor 114. If resistors 118, 120 are of equal magnitude, the instantaneous potential at the base of transistor 114 is $\frac{1}{2}V_{TH}+\frac{1}{2}V_{in}$, where $V_{in}$ is the instantaneous potential of the AC input signal.

Consequently, when $V_{in}=+V_{TH}$, the potential at the base of transistor 114 is $\frac{1}{2}V_{TH}(DC)+\frac{1}{2}V_{TH}(AC)$, for a total of $V_{TH}$. Likewise, when $V_{in}=-V_{TH}$, the potential at the base of transistor 114 is $\frac{1}{2}V_{TH}(DC)-\frac{1}{2}V_{TH}(AC)$, for a total of zero. It will therefore be seen that the circuit of FIG. 5 functions in exactly the same manner as the circuit of FIG. 4.

Figures 1, 3:
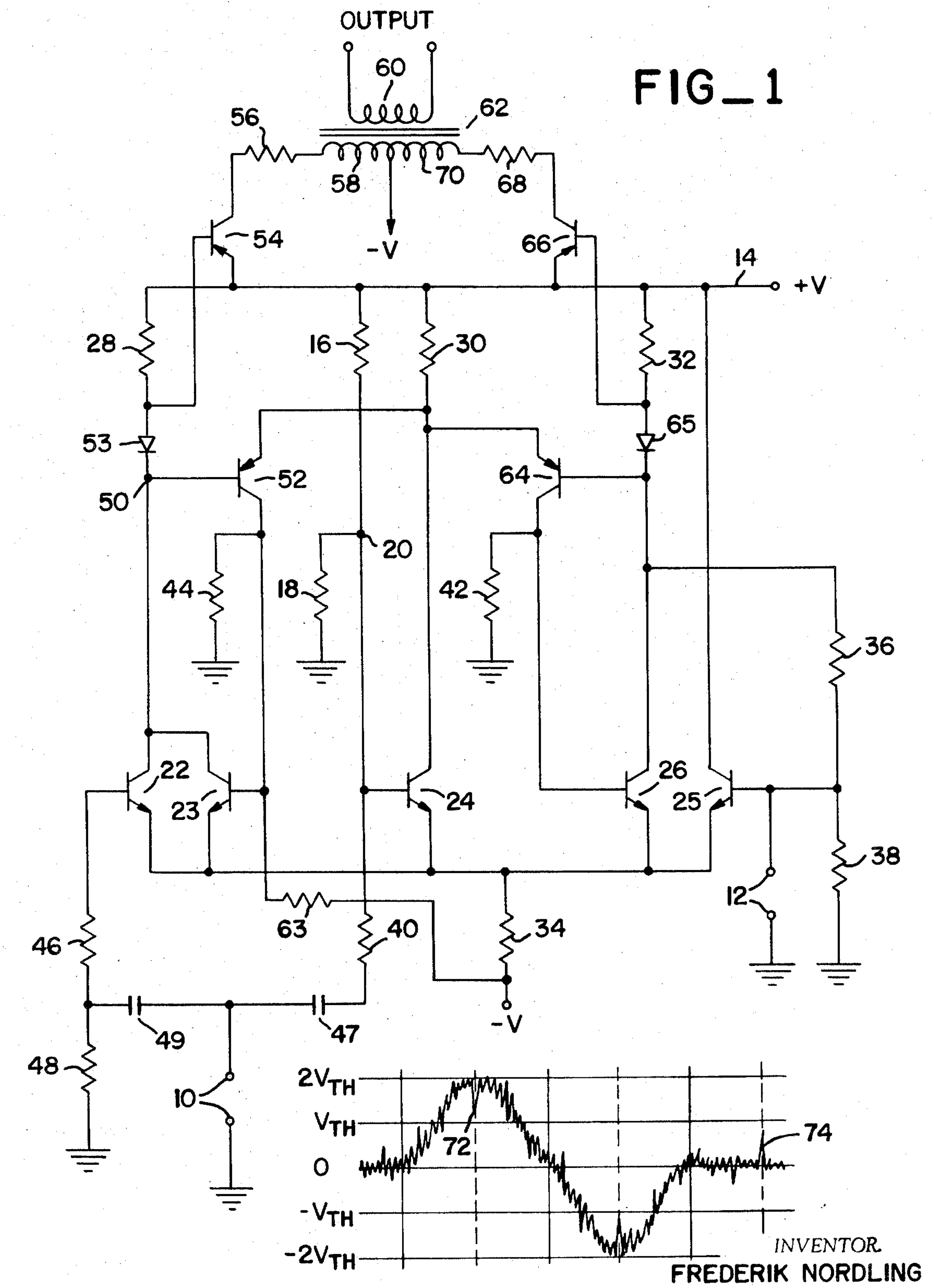
FIG. 1 is an overall diagram of the sampling and retiming circuit of this invention.
FIG. 3 is a representation of a portion of the wave train of FIG. 2*a*, showing the effect of noise upon the signal waveform in an exaggerated manner.
Figure 2:
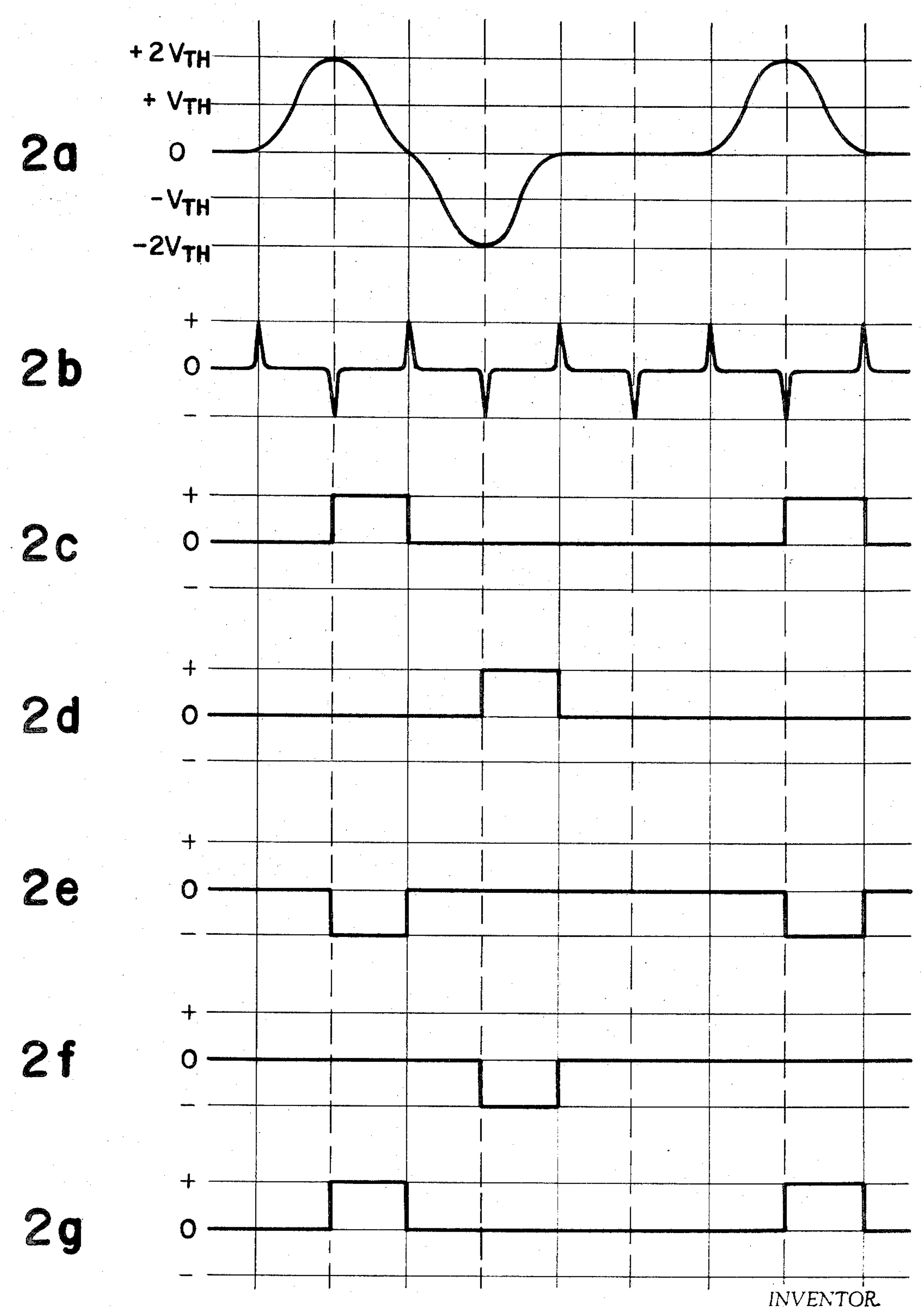
FIG. 2 is a diagrammatical representation, correlated as to time, of the waveforms appearing at various points in the circuit of FIG. 1.

FIG. 1 illustrates the operation of the sampling and retiming circuit of this invention. An equalized signal pulse train such as, for example, that appearing at output 18 of the equalizer of copending application Ser. No. 814,680, filed Apr. 9, 1969, now U.S. Pat. No. 3,578,914, and entitled Equalizer with Automatic Line Build Out, is supplied to the signal input 10. Typically, the peak amplitude of the equalized signal may be 1 volt. A clock spike train composed of alternating clock spikes of equal amplitude but opposite polarity is supplied to the clock input 12. Typically, the amplitude of the clock spikes may be 1_ volts. The respective waveforms appearing at signal input 10 and clock input 12 are shown in FIGS. 2*a* and 2*b*. It will be understood that the clock spikes of FIG. 2*b* are so timed that the negative spikes always occur at the peak of the signal pulses of FIG. 2*a*, and that the positive spikes occur a predetermined time (i.e. one-half time slot) after the negative spikes.

A positive DC power supply +V of relatively large potential is provided at the positive bus 14. A DC voltage divider consisting of resistors 16, 18 provides a steady state DC voltage at point 20. The resistors 16, 18 are so proportioned that the DC voltage at point 20 equals one-half of the threshold voltage $V_{Th}$ (FIG. 2*a*). The threshold voltage $V_{TH}$ is so chosen, as hereinafter described, that if the absolute value of the equalized signal is greater than $V_{TH}$ at the moment of occurrence of a negative clock spike, the circuit will sense the presence of an incoming signal pulse and will react accordingly.

Transistors 22, 24, 26, voltage divider 18, 40, constant current resistor 34, and load resistors 28, 30, 32 make up a dual limit detector as hereinabove described. The detector of FIG. 1 is of the AC-coupled-type shown in FIG. 5, with capacitors 47, 49 and resistor 48 corresponding to capacitors 132, 134 and resistor 128, respectively. The steady state DC potential of $\frac{1}{2}V_{TH}$ at the base of transistor 24 is produced, in the circuit of FIG. 1, by the DC voltage divider 16, 18 powered from the positive supply bus 14.

In the normal condition of the circuit between a positive and a negative clock spike, the voltage divider consisting of resistors 36, 38 maintains the base of transistor 25 at a positive voltage of, e.g. 1¼ volts; i.e. slightly less than the amplitude of the negative clock spikes. In this condition, the transistor 25 conducts, and the other four transistors are cut off.

When a negative clock spike appears at clock input 12, the base of transistor 25 is momentarily driven below cutoff. At that time, conduction is taken over by transistor 22, 24 or 26 depending on the condition of the signal input 10 at that moment. If the signal voltage at signal input 10 is, for example, twice the threshold voltage $V_{TH}$ in the positive direction, then the base of transistor 22 will be at $+2V_{TH}$. At the same time, the AC voltage divider consisting of equal resistors 40, 18 causes one-half of the signal voltage to be added to the DC voltage of $\frac{1}{2}V_{TH}$ appearing at point 20, for a total of $+1.5\ V_{TH}$. Consequently, the base of transistor 24 will at that moment be at $+V_{th}$. The base of transistor 26, being connected to ground through the small resistor 42, will be at ground potential. Likewise, the base of transistor 23 is essentially grounded through the relatively small resistor 44. TH.

It will therefore be seen that in this condition, transistor 22 will conduct. The resistance of resistor 46 is sufficiently small to cause no significant drop in the input signal voltage; its purpose is merely to provide the same drop in the base circuit of transistor 22 as is resent in the other transistors of the dual limit detector. Resistor 48, of course, is merely the grounding resistor for the base of transistor 22.

The conduction of transistor 22 causes a current to flow through resistor 28, as a result of which the voltage at point 50 drops below ground level. This causes the PNP-transistor 52 to conduct, and its conduction causes a voltage drop across resistor 44. Resistor 44 is so chosen that the voltage drop across it when transistor 52 conducts is, e.g., 1½ volts; i.e. slightly larger than the positive voltage applied to the base of transistor 25 by the voltage divider 36, 38. As a result, the base of transistor 23 becomes more positive than the normal state potential at the base of transistor 25, and when the negative clock spike disappears, conduction is maintained through transistor 23 instead of reverting to transistor 25.

Diode 53 compensates for the base-emitter drop of the unsaturated transistor 52. At the same time, the diode 53 serves to provide an additional drop, once current flow through resistor 28 is established, to curb any indecision of the circuit and to positively actuate the clean-decision amplifier transistor 52.

The conduction of transistor 23 continues to draw current through resistor 28, and the circuit is effectively locked in the conduction state of the circuit branch containing resistor 28. The voltage drop across resistor 28 also drives the base of output amplifier transistor 54 to saturation in the negative direction, and since transistor 54 is a PNP-transistor a current flow independent of the drop across resistor 28 is established through ringing damper resistor 56 and the positive half 58 of the primary winding of output transformer 62. The secondary winding 60 of output transformer 62 therefore, registers a positive output. It will be understood that the characteristics of the output transformer 62 are such that it will pass square-wave signal pulses of the frequency contemplated without significant degradation, and that conventional noise elimination and pulse shaping circuitry (not shown) may be added as necessary.

The above situation continues until the appearance of a positive clock spike at clock input 12. Upon the occurrence of a positive clock spike, the potential of the base of transistor 25 rises to a higher level than the drop across resistor 44, and conduction switches from transistor 23 to transistor 25. At this moment, the signal voltage at the signal input 10 is always essentially zero, as will be readily seen from FIG. 2*a*. Therefore, transistor 22 cannot recapture conduction, and transistor 25 continues to conduct after the disappearance of the positive clock spike due to the positive steady state voltage supplied to its base by voltage divider 36, 38. As soon as conduction switches from transistor 23 to transistor 25, the current flow through resistor 28 ceases; transistor 52 cuts off, and the voltage drop across resistor 44 disappears. At the same time, transistor 54 ceases to conduct, and the positive output voltage in the secondary winding 60 of output transformer 62 ceases abruptly.

If at the next occurrence of a negative clock $V_{TH}$, the signal voltage is, for example, $-2V_{TH}$, the following occurs: the base of transistor 22 is at $-2V_{TH}$; the base of transistor 24 is at $-\frac{1}{2}V_{TH}$($\frac{1}{2}V_{TH}$DC$-V_{TH}$ AC); the base of transistor 26 is at ground; and the base of transistor 25 is somewhat below ground potential during the negative clock spike. The base of transistor 23 is at a small potential (e.g., 150 mv.) below ground due to the voltage divider action of resistor 44 and the large resistor 63 connected between the base of transistor 23 and the negative DC power supply $-V$.

Consequently, transistor 26 will take over conduction and the resulting voltage drop across resistor 32 and diode 65 (which functions like diode 53) turns on PNP-transistor 64. The conduction of transistor 64 causes a voltage drop through resistor 42 in excess of the positive voltage supplied to the base of transistor 25 by the voltage divider 36, 38, and transistor 26 becomes the most positive of the set and continues to conduct even after cessation of the negative clock spike. The voltage drop across resistor 32 also drives the base of PNP-transistor 66 to saturation in the negative direction and causes transistor 66 to conduct. A current independent of the drop across resistor 32 thereupon flows through the ringing damper resistor 68 and the negative half 70 of the primary winding of output transformer 62 so as to cause a negative output in the secondary winding 60.

Upon the occurrence of the next positive clock spike, the base of transistor 25 becomes more positive than the base of transistor 26, and transistor 26 is switched off. The current flow through resistor 32 than ceases, transistors 64 and 66 cut off sharply and the negative output voltage in secondary winding 60 ceases.

If, at the occurrence of the next negative clock spike, the signal voltage at signal input 10 is zero (or if its absolute value is less than $V_{TH}$), the condition will be as follows: the bases of transistors 22, 23, and 26 will all be at or near ground potential, the base of transistor 25 will be below ground potential during the negative clock spike, the base of transistor 24 will be at $+\frac{1}{2}V_{TH}$ (due to the effect of DC voltage divider 16, 18). Consequently, transistor 24 will conduct momentarily. Presently, however, the disappearance of the negative clock spike switches conduction back to transistor 25, inasmuch as the potential applied to the base of transistor 25 by voltage divider 36, 38 is greater than $\frac{1}{2}V_{TH}$. Since the circuit of transistor 24 is not connected to the output transformer 62, no output occurs as a result of its momentary conduction.

It will be seen that the operation of the circuit is such that a train of reconstituted square-wave signal pulses having a pulse width equal to the time interval between the negative and the positive clock spikes (i.e. one-half time slot), and a sign equal to the sign of the equalized input signal pulses, appears at the output in perfect synchronism with the pulsations of the equalized input signal.

It will be noted that resistor 30 does not have an output-creating function in the circuit of FIG. 1 as it does in the circuits of FIGS. 4 and 5. It is retained, however, for this reason: When the input signal voltage at the time of sampling rises through $V_{TH}$, the circuit momentarily passes through an area of indecision in which transistor 24 ceases to conduct and transistor 22 begins to conduct. If the emitter of transistor 52 were connected directly to the positive bus 14, conduction of transistor 52, and hence lock-in of transistor 23, would occur before the threshold is reached. The voltage drop in resistor 30, which at the threshold equals the drop in resistor 28, prevents transistor 52 from firing until the threshold is reached and the voltage drop across diode 53 (which, as stated above, is equal to the base-emitter drop of transistor 52) has placed transistor 52 on the verge of conduction.

The same function, of course, occurs with respect to transistor 65 at the lower threshold $-V_{TH}$. On the other hand, no resistor is needed in the branch of transistor 25, as the latter is not a signal branch.

The base circuits of the three signal transistors all have the same impedance so that conduction will have the same drop effect (i.e. signal loading effect) on all three signal transistors. Specifically, the parallel resistance of resistors 44 and 63 is equal to the resistance of resistor 42, and is also equal to the parallel resistance of resistors 18, 16, and 40. Resistors 42 and 44 are substantially equal inasmuch as they have the same function of providing a drop, during conduction, exceeding that of resistor 38. Resistor 63 is much larger and cooperates with resistor 44 to form a substantially constant-current voltage divider which normally maintains the base of transistor 23 slightly below ground level to prevent accidental conduction of transistor 23 instead of transistor 26 when the input signal is below $-V_{TH}$.

The wave train of FIG. 2*c*, *d*, *e*, and *f* illustrate, respectively, the voltages impressed upon the bases of transistors 23, 26, 54, and 66, while FIG. 2*g* illustrates the output signal, which is suitable for transmission through the next section of telephone cable.

FIG. 3 illustrates (in exaggerated fashion) the effect of noise on the signal waveform of FIG. 2*a*. It will be noted that the threshold voltage $V_{TH}$ should be chosen low enough to produce a "signal pulse present" response in the circuit under the most adverse noise condition anticipated at the moment of sampling (as at 72), yet high enough to prevent a 37 signal pulse present" response if only noise is present at the moment of sampling (as at 74). Mathematically, these conditions are best met when $V_{TH}$ equals one-half of the peak signal amplitude.

I claim:

1. A multiple level detector comprising:
   a. a plurality of transistors having their emitters directly connected together;
   b. a source of substantially constant current applied to the emitter-collector circuits of said transistors so that only the transistor with the largest base voltage conducts at any given time;
   c. input means connected to apply a varying input voltage to the base of at least one of said transistors, and a fixed voltage to the base of another of said transistors; and
   d. output means connected to the collector circuit of at least one of said transistors to produce a substantially constant output voltage whenever said transistor conducts.

2. The circuit of claim 1, in which there are three transistors, the base of the first of said transistors being operatively connected to said input signal source; the base of the second of said transistors being operatively connected to said input signal source and to a source of constant potential; and the base of the third of said transistors being maintained at a fixed potential.

3. The circuit of claim 2, in which said fixed potential is a ground potential about which the potential of said input signal varies; said second transistor is arranged to conduct when the magnitude of the input signal potential with respect to ground is smaller than a predetermined threshold value; and the magnitude of said constant potential with respect to ground is equal to said threshold value.

4. The circuit of claim 3, in which voltage dividing means are provided between said input, ground, and second transistor so as to apply only one-half of the potential of said input signal with respect to ground to the base of said second transistor, and in which means are also provided for applying a DC potential equal to one-half of said threshold value to the base of said second transistor concurrently with said halved input potential.

* * * * *